United States Patent [19]

Seymour

[11] Patent Number: 5,569,893
[45] Date of Patent: Oct. 29, 1996

[54] DRIVER AIR BAG COVER WITH INTEGRAL HORN AND REDUNDANT SWITCHES

[75] Inventor: Brian T. Seymour, Royal Oak, Mich.

[73] Assignee: Takata Inc., Auburn Hills, Mich.

[21] Appl. No.: 419,134

[22] Filed: Apr. 10, 1995

[51] Int. Cl.$^6$ .............................. B60R 21/16; H01H 9/00
[52] U.S. Cl. ................................ 200/61.54; 200/61.55; 280/731
[58] Field of Search .......................... 200/61.54, 61.55, 200/61.56; 280/728.1, 728.2, 728.3, 731

[56] References Cited

U.S. PATENT DOCUMENTS

| | | | |
|---|---|---|---|
| 4,638,131 | 1/1987 | Kidd et al. | 200/61.55 |
| 4,934,735 | 6/1990 | Embach | 280/731 |
| 5,002,306 | 3/1991 | Hiramitsu et al. | 200/61.54 X |
| 5,062,661 | 11/1991 | Winget | 280/731 |
| 5,085,461 | 2/1992 | Shibata | 280/731 |
| 5,085,462 | 2/1992 | Gualtier | 280/731 |
| 5,152,358 | 10/1992 | Kozuka | 180/78 |
| 5,186,490 | 2/1993 | Adams et al. | 280/731 |
| 5,198,629 | 3/1993 | Hayashi et al. | 200/61.54 |
| 5,265,904 | 11/1993 | Shelton et al. | 280/731 |
| 5,265,905 | 11/1993 | Shelton | 280/731 |
| 5,344,185 | 9/1994 | Cooke, II | 280/731 |
| 5,350,190 | 9/1994 | Szigethy | 280/728.2 |

FOREIGN PATENT DOCUMENTS

| | | | |
|---|---|---|---|
| B24546 | 5/1994 | Australia | 280/731 |
| 2347255 | 4/1974 | Germany | 280/731 |
| 4310625 | 10/1993 | Germany | 280/731 |
| 4317737 | 12/1993 | Germany | 280/731 |
| 5-330394 | 12/1993 | Japan | 280/731 |

OTHER PUBLICATIONS

*Development of a New Downsized Airbag System for Use in Passenger Vehicles*, James P. Karlow, J. John Jakovski, Brian Seymour, 1994 SAE International Congress & Exposition.

Primary Examiner—J. R. Scott
Attorney, Agent, or Firm—Harness, Dickey & Pierce PLC

[57] ABSTRACT

An improved driver air bag module cover having a unitary membrane switch assembly including a central horn switch and adjacent accessory switches independently operable in response to user-imparted pressure-induced deformation of the cover front face. Preferably a single sheet of membrane material carries the horn switch, adjacent accessory switches, electrical leads, and connector. Preferably, the U-shaped central tear seam provides a major central portion for placement of the horn switch at a center location of a steering wheel. Cover side walls further locally enforce the cover to prevent inadvertent activation of adjacent accessory switches. Buttons integrally formed in the cover over such switches are preferably formed from a translucent material to provide for backlighting with an electroluminescent sheet. Finally, the central backing plate directly molded into the cover back face entraps the horn switch and membrane to the back of the cover. Additionally, local backing plates mount the peripheral portions of the membrane, including the accessory switches, along with any electroluminescent sheet underneath the outer peripheral portions of the cover.

20 Claims, 2 Drawing Sheets

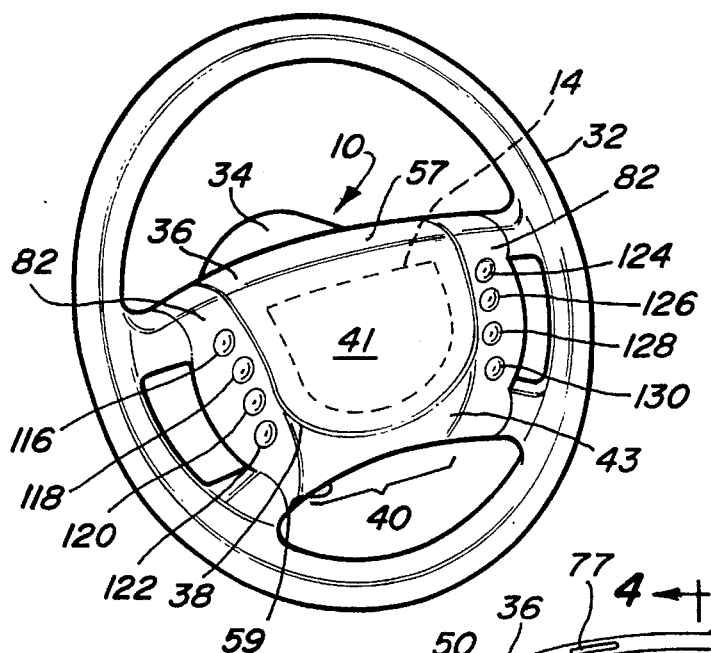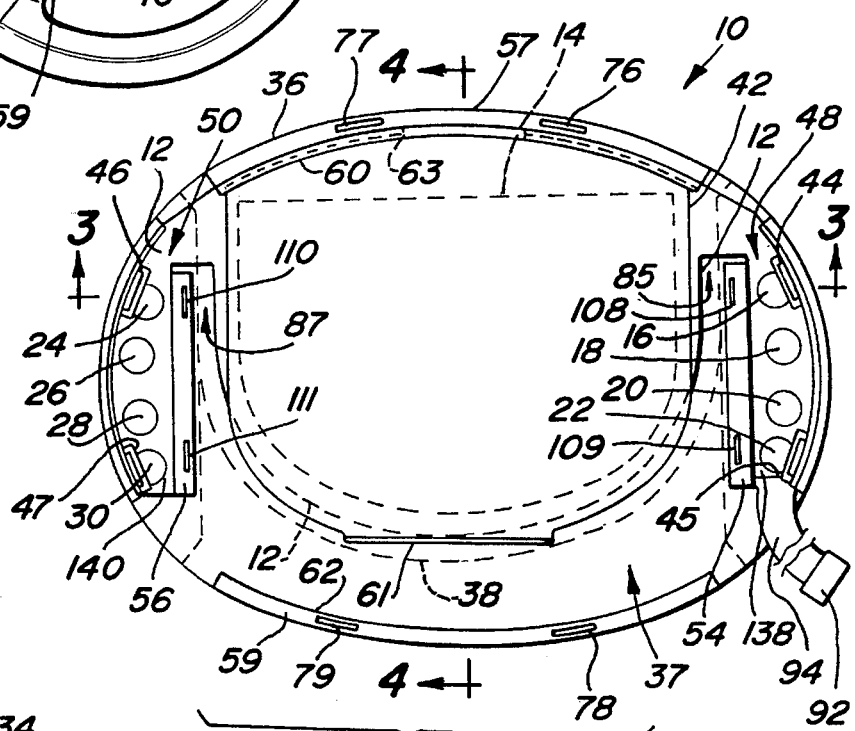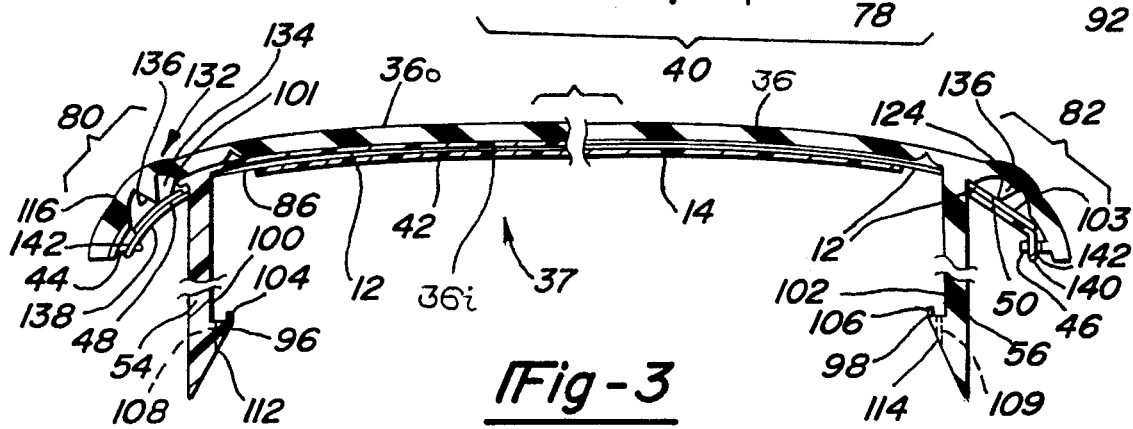

DRIVER AIR BAG COVER WITH INTEGRAL HORN AND REDUNDANT SWITCHES

FIELD OF THE INVENTION

This invention relates to inflatable motor vehicle occupant restraint systems, and more particularly to an improved driver air bag module cover including an array having an integral horn switch and redundant accessory switches.

BACKGROUND OF THE INVENTION

Conventional horn switches for automobiles were traditionally mounted atop a center hub of a steering wheel. However, attempts were eventually made to boldly style the center features of a steering wheel which lead to designs having a molded and padded center cover alongside which a pair of rabbit ear horn switches depend, one extending from each side. With the introduction of driver air bag modules, it also became desirous to mount air bag modules at the center of a steering wheel, so the previously implemented center cover feature was also carried forward for use with air bags. Therefore, it remained necessary to continue mounting horn switches either on rabbit ears, or to provide the horn switches on an outer edge of the air bag module cover, and as a result various related designs are presently in use. However, many users desire placement of both the air bag module and horn switch at the center of the steering wheel. Center placement of the horn switch allows a user to quickly and accurately trigger a vehicle horn no matter what angular position the steering wheel is in. Furthermore, many users desire accessory switches which are incorporated within the design surface of the air bag cover. As a result, several attempts have also been made to incorporate switches directly into the design of an air bag module, including horn switches that activate a horn by pressing a center portion of the module.

One design features an air bag module that is mounted with resilient springs to a steering wheel hub. A contact horn switch, which is provided between the module and hub, is activated by depressing the module against the hub to compress the springs which closes a circuit and activates a vehicle horn. However, the air bag actually "floats" above the steering wheel hub on the springs, requiring a significant increase in the number of parts needed to assemble the module to the hub, and furthermore increasing the cost and complexity of assembly. Additionally, when accessory switches are also provided on the module, activation of the accessory switches by a user caused by depressing the switches might also inadvertently depress and activate the horn switch.

Another design features a membrane switch molded directly into a cover for an air bag module. The cover, which is molded from a resilient material, is manually depressed by a user in order to activate the switch. The membrane switch can reduce overall cost, size of the module cover within the steering wheel hub, and ease of module assembly. However, the cover must be flexible in order to allow switch activation, and for cases where one switch is mounted in close proximity to adjacent switches on a cover, it becomes difficult to assure discrete activation of an individual button since activation of one switch will deform the cover over a surrounding region. As a result, if the switches are too close together, a nearest neighbor switch might be inadvertently activated.

Finally, redundant accessory switches have recently been added to steering wheels in order to allow a driver to activate various vehicle features directly from the steering wheel. For example, radio controls, cruise controls, cellular telephone buttons, and air conditioning buttons have all been located on separate switches attached to a steering wheel. In most cases, the switches are redundant with switches found on the vehicle instrument panel, and are added to provide driver convenience and safety. Usually, the switches are attached to the steering column adjacent the air bag module. For example, the switches can be attached to a molded surface of the wheel surrounding the mounted air bag, preferably along the inner spokes of the steering wheel. Alternatively, the switches can be provided directly on the air bag module along an outer peripheral portion of the module, but away from cover deployment doors as well as the trajectory path of an inflating air bag as the bag deploys through the center of the air bag module. However, the switches are typically formed from a number of separate pieces that mount through openings in the cover, and as a result they complicate construction and assembly of the module.

SUMMARY OF THE INVENTION

Pursuant to this invention, an improved driver air bag module cover is provided having a unitary membrane switch assembly, including a central horn switch and adjacent accessory switches. Preferably, the membrane switch assembly is formed from a sheet of membrane material that is retained against the back side of the cover by a folded-in protector/backing plate provided behind the horn pad. Preferably, the cover includes a U-shaped central tear seam that divides the front surface of the cover to provide an approximately 70% frontal surface area horn pad and a remaining 30% unused lower surface area, thereby eliminating previous 50%/50% surface area dual membrane horn pads that require additional parts and wiring. Additionally, side walls that extend rearwardly from the back face of the cover are positioned so as to separate the redundant accessory switches from the central horn switch, which prevents inadvertent activation of the redundant accessory switches as a consequence of the cover flexing when activating the vehicle horn. However, adjacent accessory switch are formed with in-molded flexible button features which assure independent activation via localized deformation of the cover about each button. The side walls also function to mount the cover onto an air bag base plate.

Preferably, the cover is formed from a two shot molded piece of plastic having a hard plastic inner structure, including the side walls, and a soft rubber-like plastic outer surface. The in-molded flexible button features for the accessory switches are formed from the outer surface. A local aperture is provided in the inner structure through which a portion of the flexible buttons extend.

Furthermore, the redundant accessory switches are preferably integrally formed from the outer surface of the cover by molding the outer surface of the cover from a translucent material, masking over raised button faces formed by the cover directly over the switches, and painting the cover so as to light-block the cover. Thereafter, the masking is removed from the button faces, so as to leave translucent button faces over the switches that are readily suitable for back-lighting with a electroluminescent sheet. The redundant accessory switches are activated by the buttons which are integrally molded into the cover. The buttons, formed by the outer surface of the cover, include rearwardly extending fingers formed from the back face of each button face having a locally thinned region, or encircling cavity formed about each finger that facilitates flexing of the button during finger-engaging activation by a user. Finally, the redundant accessory switches include molded-in slots in the inner structure of the cover for retaining the switches, an electroluminescent sheet, and a pair of plastic backing plates mounted in-position under the cover face flange, biased in position behind the cover for activation.

According to the present invention, a backing plate is directly molded from the inner structure of the cover back face, preferably in a configuration perpendicular to the back face. The backing plate is formed with an integral hinge where it joins the cover back face. The hinge facilitates folding of the backing plate to a nested position adjacent substantially the back face of the cover. The opposite end of the cover snap engages with a retaining lip also integrally molded to form the inner surface of the cover back face opposite the hinge. In this manner, a unitary sheet of membrane material is positioned against the back face of the cover and the backing plate is folded against the cover to trap the horn switch portion of the sheet of membrane material against the back of the cover. Additionally, a pair of local backing plates are mounted under the cover periphery, one behind each group of accessory switches on opposite peripheral sides of the horn switch.

Therefore, in constructing a unitary sheet of membrane material for use with this invention, presently available membrane switch technologies are utilized to form a centrally located horn switch in a center region of the sheet of material, that is separated by a pair of laterally extending peripheral membrane portions carrying groups of accessory switches. Preferably, each peripheral portion of membrane material is separated from the horn switch by a slot. To ease assembly, each peripheral portion of membrane material is preferably attached to the horn switch at only one end. When assembled to the back side of the air bag cover, side walls extending rearwardly of the cover extend through the slot between the peripheral portions and the horn switch, thereby isolating the horn switch from the accessory switches in operation. The resulting structure functions to locally isolate rearward deformations of the cover face caused when a user depresses the horn switch so as to prevent inadvertent activation of adjacent accessory switches when blowing a vehicle horn, or alternatively, inadvertently blowing the horn switch when activating an accessory switch.

Objects, features, and advantages of this invention are to provide an improved air cushion cover assembly which provides a unitary membrane switch assembly with a one-piece centrally located horn switch and at least one isolated redundant accessory switch adjacent the horn switch near a peripheral edge of the cover. Preferably, the cover includes a rearwardly extending side member that is provided between the horn and one of the accessory switches to isolate the switches so as to localize cover flexing during operation of one of the switches. The cover can either be a two-shot molded plastic component, or a one-shot molded plastic component, and preferably also has a foldable backing plate and molded-in slots for retaining the sheet membrane switch assembly against the back of the cover. The cover can also be molded from a translucent material, afterwhich button regions are masked over while the cover is painted an opaque color to produce translucent button regions in the cover. For the case of a two-shot molded cover, the outer surface is constructed of translucent material. Furthermore, a U-shaped central tear seam provided in a central region in the cover defines a surface behind which the horn switch is located, eliminating any need to form the horn switch from a plurality of members in order to assure location of the horn in the center of the steering wheel cover. The resulting cover and switch assembly is lightweight, formed from a substantially single piece of either one-shot or two-shot molded plastic material, strong, rugged, durable, and is of a simplified design that is easy and economical to manufacture and assemble.

Further objects, features, and advantages of the invention will become apparent from a consideration of the following description and the appended claims when taken in connection with the accompanying drawings.

BRIEF DESCRIPTION OF THE DRAWINGS

FIG. 1 is a perspective view of an inflatable motor vehicle occupant restraint system incorporating the cover assembly of this invention assembled to a vehicle steering wheel;

FIG. 2 is a plan view showing the underside of the air bag cover assembly of this invention;

FIG. 3 is a cross-sectional view taken along line 3—3 of FIG. 2, but additionally depicts an alternative one-shot molded construction;

DETAILED DESCRIPTION OF THE PREFERRED EMBODIMENT

Figure 4:
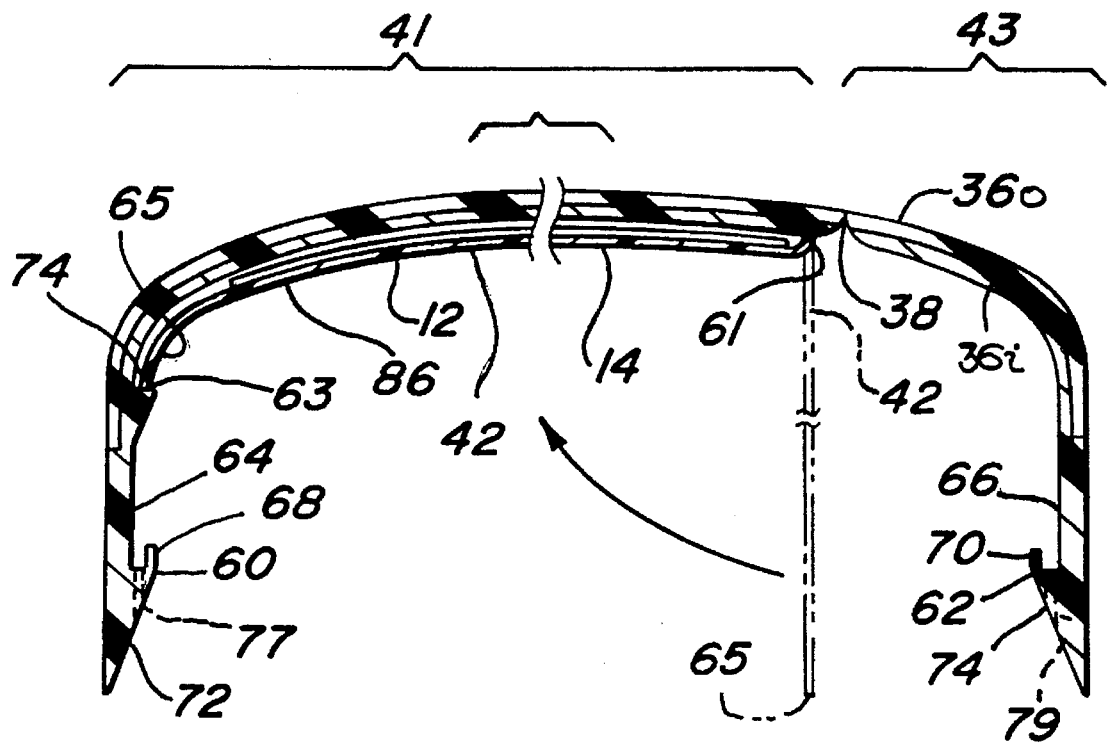
FIG. 4 is a cross-sectional view taken along line 4—4 of FIG. 3 depicting a preferred two-shot molded construction.

FIG. 1 illustrates an air bag cover assembly 10 in which a unitary sheet of membrane switch material 12 is retained comprising a horn switch 14 and a plurality of accessory switches 16–30 that are formed together on a common sheet of membrane material, including a grid of electrical wiring leads terminating in an electrical connector. The leads (not shown) electrically connect each switch to the connector. The horn switch occupies a central location of a steering wheel 32. The cover assembly 10 is mounted centrally of the steering wheel by attaching it to a center hub 34 of the steering wheel with fasteners (not shown).

The assembly 10 is formed from a cover 36 molded in one-piece from a plastic material with a U-shaped tear seam 38 that bisects a central region 40 to form a major and minor portion 41 and 43. Preferably, the cover is formed from a two-shot molded construction with a hard, yet resilient plastic inner structure 36i and a soft rubber-like plastic outer surface 36o. Alternatively, as shown in the right side of FIG. 3, the cover can be formed from a one-shot construction of a semi-rigid, yet resilient plastic material.

Preferably, the horn switch is mounted behind the major portion 41 of the cover 36 so as to occupy the center portion of the steering wheel. A protector plate 42 is integrally molded with the cover in a position that extends rearwardly of the cover 36 during formation. The protector plate 42 is subsequently folded against the back of the cover 36 while the membrane sheet 12 is seated against the cover, trapping a central portion of the membrane 12, namely the horn switch 14, behind the cover. Additionally, a plurality of through-slots 44—47, one pair provided on each side of the cover, are formed on a back face 37 of the cover in order to facilitate mounting a pair of depending outer peripheral portions 48 & 50 of the membrane 12 to the cover back face 37.

Furthermore, a raised button 116–130 is integrally molded into a front face 39 of the cover over each accessory switch 16–30. Each button visually and tactilly demarcates the position of each switch with respect to the front face of the cover 36. For the case of a two-shot molded cover, the button is formed by the soft outer surface 36 and an aperture is formed in the inner structure 36; directly beneath the button.

The cover 36 is preferably two-shot molded from a single piece of elastomeric material forming the inner structure 36i, for example, polyester elastomer (TPE) manufactured by HOECHST CELANESE under the trade name Rite Flex 635. The outer surface 36o is preferably formed from a softer rubber-like plastic having a more resilient and compliant surface. A pair of side walls 54 & 56 extending rearwardly of the cover backface 37 provide a structure for mounting the cover to a rim-edge of a driver air bag module base plate (not shown). Additionally, a top wall 57 and a bottom wall 59 extend rearwardly of the top and bottom edges of the cover front face 39 such that a distal end of each wall form top and bottom inner lip edges 60 and 62, respectively. Each inner lip edge has an inner face 64 and 66, a folded back lip 68 and 70, and a ramped engagement face 72 and 74, respectively. Furthermore, a pair of spaced-apart through-slots 76, 77 and 78, 79 extend through each lip edge, respectively. When assembled to a driver air bag module base plate (not shown), the top and bottom inner lip edges structurally mate with complementary corresponding top and bottom downturned edge flanges, including pairs of spaced apart tabs, on a base plate. Concurrent with attaching the side walls to a base plate, the top and bottom folded back lips also mate with corresponding downturned portions of the base plate. A suitable mounting structure for mating the cover inner lip edges 60 and 62, as well as side walls 54 and 56 to a baseplate is disclosed in Applicant's co-pending application, Ser. No. 08/294,111 directed to a Snap-Fit Module Cover, hereinafter incorporated by reference.

Preferably, the cover 36 is divided into several regions; namely, the central region 40 which is subdivided into an upper major portion 41 and a lower minor portion 43. The horn switch is preferably mounted behind the major portion. A pair of downwardly sloping and depending peripheral edges 80 and 82 are also formed by the cover behind which the accessory switches 16–30 are mounted. Finally, a bottom peripheral region, or minor portion 43 is formed by the cover. The U-shaped tear seam 38 separates the central region 40 into the major and minor portions, and also separates the central region from the peripheral edges on either side. Preferably, the major portion comprises 70% of the surface area of the central region. Therefore, the minor portion comprises the remaining 30% of the central region. With this configuration, the major portion substantially encompasses the center region of the cover directly over the center of the steering wheel 32. In use, a driver can successfully activate the horn switch 14 with little or no thought by instinctively hitting the cover 36 directly over the center of the steering wheel 32, namely the center hub 34.

Preferably, the side walls 54 and 56 terminate short of joining the top wall 57 in order to fit the sheet of membrane material 12 around the top edge of each side wall 54 and 56. The sheet of membrane material 12 includes a pair of slots 85 and 87 so that when inserting the sheet 12 behind the cover 36, each side wall 54 and 56 is received in each slot 85 and 86, respectively. Such a construction allows for a one-piece formation of the unitary sheet 12 while still including a separate horn switch 14 and accessory switch 16–30 integrally molded within the sheet 12.

As shown in FIG. 2, the unitary sheet of membrane material 12 has a central, or medial portion 86 corresponding with the cover central region 40 and a pair of opposite and depending lateral portions 88 and 90. The horn switch 14 is integrally formed within the material of the medial portion.

Likewise, the accessory switches 16–22 & 24–30 are integrally formed within the lateral portions 88 and 90, respectively. A switch connector 92 is mounted to an integrally formed terminal web 94 extending from the sheet of material 12. The web contains electrical leads for each of the switches 14–30. Preferably, the web is long and thin, allowing rearward positioning of the web and connector from the cover back face 37 during mounting of the air bag to facilitate connection of the connector 92 to a complementary connector (not shown) on the steering wheel hub 34. Preferably, the electrical connector also connects to electrical leads leading from a pair of electroluminescent sheets 101 and 103 disposed beneath each group of accessory switches 16–22 and 24–30, respectively. In this manner, the connector electrically couples the switches 14–30, and powers the electroluminescent sheets 101 and 103. Construction of switches 14 & 16–30 from a single sheet of membrane material 12 is generally known in the art, and is discussed in several U.S. patents, including Hayashi et al., U.S. Pat. No. 5,198,629 and Adams et al., U.S. Pat. No. 5,186,490, hereinafter incorporated by reference.

Preferably, the U-shaped tear seam 38 is molded into the back face 37 of the cover 36 in order to hide the seam from the view of an occupant. For the case of a two-shot molded cover, the tear seam 38 is formed in the back face of the inner structure 36i. Alternatively, the tear seam can be molded into the front face 39 of the cover, or into both the front and back faces.

As shown in FIGS. 3 and 4, protector plate 42 is integrally molded with the cover 36. For a two-shot molded cover, plate 42 is integrally formed from the inner structure 36i. Preferably, the plate is molded into place in a rearwardly extending, or perpendicular direction from the cover back face 37. Subsequently, the sheet of membrane material is mated to the back face 37 of the cover, and the protector plate is folded along an integral plastic hinge 61 adjacent the cover back face to sandwich and seat the membrane against the back face 37. A retaining lip 63 is formed on the cover back face 37, extending substantially between the side walls 54 and 56 to which the free edge of a base plate (not shown) is snap-engaged during assembly. The retaining lip is sized to create an interference fit with a free end 65 of the plate as it is folded into nested engagement with the cover back face. The retaining lip 63 has an inwardly directed sloped face 72 that creates the interference fit with the free edge 65 of the plate as it is folded against the cover back face. By forcibly biasing the free edge past the sloped face, the free edge snaps past the sloped face, trapping the free edge behind an engaging edge 74, thereby retaining the plate and membrane to the back face of the cover.

Preferably, the distal end of each side wall 54 and 56 terminates to form an inner lip edge 96 and 98, respectively. Each inner lip edge 96 and 98 is similar in construction to the inner lip edges 60 and 62 of the top and bottom walls 57 and 59, with each having an inner periphery, or face 100 and 102, and a folded back lip 104 and 106. Preferably, pairs of spaced apart through-slots 108, 109 and 110, 111 extend through the inner lip edge of each side wall 54 and 56, respectively, each proximate a ramped engagement face 112 and 114. A suitable base plate (not shown), as discussed supra, will be formed from a sheet metal stamping with a pair of equally spaced-apart downturned edge flanges. Each edge flange will terminate in a pair of tabs that complementarily mate with the slots when assembled.

As shown in FIG. 3, buttons 116–130 are integrally formed within the cover 36 directly above each accessory switch 16–30, respectively. For example, button 116 is constructed with a raised button face 132 that protrudes from the cover front face 39 to assure tactile location of the button on the front cover. A toroidal cavity 134 preferably having a surface of revolution created with a compound curved surface defines a finger 136 that extends rearward of the button face to coact with the accessory switch 16 upon depression of the button face 116 by a user. The cavity 134 forms a thinned-out region circumferential about finger 136 in the cover 36 which makes the button flexible and compliant in relation to the surrounding cover. For the two-shot molded cover, the button is entirely formed by the outer surface 36o, and apertures are formed beneath the button in the inner structure 36i to allow through-passage of finger 136. The outer peripheral portions 48 and 50 of membrane 12, including switches 16–22, are held in proximate position underneath the fingers 136 of each button via either backing plate 138 or 140, respectively. The backing plates provide a rigid back-up support for the peripheral portions 48 and 50 and accompanying switches as the finger 136 of each respective switch is downwardly biased by a user to engage against the associated switch, causing compressive activation thereagainst.

Preferably, the backing plate 138 is sized such that during assembly it must be forcibly biased against the outer face of side wall 54 afterwhich a pair of spaced apart tabs 142 on plate 138 are received through complementary slots 44 and 45. As a result, the backing plate is rigidly entrapped between the side wall 54 and the tabs 44 and 45, holding the peripheral portion of the membrane 48 in relation to the finger 136. Similarly, backing plate 140 is identically provided to support the other outer peripheral portion 50 between side wall 56 and complementary corresponding through-slots 46 and 47. Preferably, backing plates 138 and 140 are formed from a rigid, or semi-rigid plastic sheet of material. Furthermore, each backing plate preferably substantially encompasses the region directly beneath each peripheral portion 48 and 50, respectively. Therefore, protector plate 42 supports horn switch 40, and backing plates 138 and 140 support membrane peripheral portions 48 and 50, respectively.

To assemble the molded cover to the base plate, the pair of ramped engagement faces 72, 74 and 112, 114 are brought into engagement with the top face of the base plate alongside two pairs of oppositely oriented downturned edge flanges. The cover is then forcibly biased into engagement with the baseplate, laterally biasing the side walls apart until the folded back lip on each side wall clears each tab, at which point an air bag compressively biased between the cover and baseplate forcibly biases apart the cover and base plate, which engages the tabs within the through slots and the terminating edge of the downturned edge flange with the peripheral end edge of the base plate.

While the above description constitutes the preferred embodiments of the present invention, it will be appreciated that the invention is susceptible of modification, variation and change without departing from the proper scope and fair meaning of the accompanying claims.

I claim:

1. A cover for use with a driver air bag module of the kind including an air bag, a base plate, and an inflator which is mounted to a driver's side steering wheel hub, the cover comprising:

a resilient front panel having a central portion and a peripheral edge portion;

at least one side wall rearwardly extending from a back face of said front panel generally about a region disposed between the central and peripheral edge portions of said front panel, said side wall also constructed and arranged for engagement with the base plate during assembly;

a membrane horn switch operably connected to said front panel beneath said front panel central portion and constructed and arranged for actuation in response to deformation of said front panel central portion by a user; and at least one membrane accessory switch operably connected to said front panel beneath said front panel peripheral edge portion and constructed and arranged for manual actuation in response to deformation by a user of said front panel peripheral edge portion proximal said accessory switch.

2. The cover of claim 1 wherein said membrane horn switch and said membrane accessory switch are integrally formed on a unitary piece of membrane material.

3. The cover of claim 2 wherein a pair of membrane accessory switches depend from said membrane horn switch one on either side along an end portion so as to form a slot-shaped gap therebetween into which a rib is received in assembly.

4. The cover of claim 3 wherein said central portion further comprising a U-shaped central tear seam provided in said central portion, said tear seam configuration to bisect said central portion forming a major and minor portion wherein said membrane horn switch underlies said major portion in assembly.

5. The cover of claim 4 wherein said major portion comprises about 70% of said central portion surface area.

6. The cover of claim 1 further comprising a back-up plate hingedly affixed at one edge to a back face of said front panel for entrapping and retaining said membrane horn switch beneath said front panel central portion.

7. The cover of claim 6 wherein said back-up plate is integrally molded with said cover.

8. The cover of claim 6 further comprising a retaining lip provided beneath said cover front panel opposite said hingedly affixed edge for retaining said plate in proximate relation to said front panel central portion backface.

9. A cover for use with a driver air bag module of the kind including an air bag a base plate, and an inflator which is mounted to a driver's side steering wheel hub, the cover comprising:

a resilient front panel having a central portion and a peripheral edge portion;

an integrally molded button located in said peripheral edge portion having a finger encircled by a toroidal, said finger extending generally rearwardly of said front panel;

at least one side wall rearwardly extending from a back face of said front panel generally about a region disposed between the central and peripheral edge portions of said front panel, said side wall also constructed and arranged for engagement with the base plate during assembly;

a membrane horn switch operably connected to said front panel beneath said front panel central portion and constructed and arranged for actuation in response to deformation of said front panel central portion by a user; and a membrane horn switch operably connected to said front panel beneath said button on said front panel peripheral edge portion, wherein said accessory switch is manually actuated by a user depressing said button causing depressed forcible engagement between said finger and said accessory switch.

10. The cover of claim 9 wherein an outer surface of the cover is molded from a translucent material afterwhich a front face portion of said button is masked-off and a paint layer is received over a front portion of said cover, subsequent to which the masked-off button face is unmasked to present a translucent button face.

11. The cover of claim 10 further comprising an electroluminescent seat supported beneath said button so as to back light said resulting translucent button face.

12. The cover of claim 9 further comprising a backing plate carried beneath said peripheral edge portion in an entrapped engagement between the said side wall and outboard retaining means when in an assembled state.

13. The cover of claim 12 wherein said retaining means comprises at least one tab extending from said backing plate constructed and arranged for interdigitating engagement with a complementary corresponding slot provided in said cover back face.

14. The cover of claim 1 wherein said membrane horn switch and said membrane accessory switch are integrally formed in a common sheet of membrane material operably connected to said front panel, beneath said front panel, said sheet further comprising a web of membrane having electrically conductive leads terminating in a connector through which said horn switch and said accessory switch electrically communicate.

15. A button switch assembly for use with a driver air bag cover constructed and arranged for use with a driver air bag module of the kind including an air bag, a base plate, and an inflator which is mounted to a driver's side steering wheel hub, the switch assembly comprising:

a switch supported beneath the air bag cover;

a button face integrally molded directly in the cover above said switch;

a finger integrally molded in the cover beneath said button face downwardly extending from the back face of the cover said finger causing forcible activation of said switch supported directly thereunder in response to a user manually depressing said button face; and a cavity integrally molded in the cover and encircling said finger wherein said button face, said finger, and said cavity comprise a button.

16. The button switch assembly of claim 15 wherein an outer surface of the cover is molded from a translucent material; said button face is masked over and a layer of opaque paint is deposited over said cover outer surface about a region encircling said button face so as to provide a translucent button face encircled with such opaque paint through which light passes from a light-emitting device contained thereunder.

17. The button switch assembly of claim 15 further comprising a backing plate carried in nested relation beneath a peripheral edge portion of the cover in entrapped engagement between a downwardly extending side wall and outboard retaining means, said backing plate for entrapping and retaining said switch beneath the air bag cover.

18. The button switch assembly of claim 17 wherein said outboard retaining means comprise a tab extending from said backing plate constructed and arranged for interdigitating engagement with a corresponding complementary slot provided in a back face of the cover.

19. A cover for use with a driver air bag module of the kind including an air bag, a base plate, and an inflator which is mounted to a driver's side steering wheel hub, the cover comprising:

a resilient front panel having a central portion and a peripheral edge portion;

a membrane switch disposed beneath said front panel;

a back-up plate pivotally affixed at one edge to a back face of said front panel, said back-up plate trapping and retaining said membrane switch beneath said front panel when in a trapping position; and a retaining lip integrally molded beneath said cover front panel opposite a hinge provided by said back-up plate for retaining said plate in engagement with said front panel back face so as to entrap and support said membrane switch therebetween.

20. The cover of claim 19 wherein said back-up panel is integrally molded in a generally rearwardly extending position from said front panel back face.

* * * * *

UNITED STATES PATENT AND TRADEMARK OFFICE
CERTIFICATE OF CORRECTION

PATENT NO. : 5,569,893
DATED : October 29, 1996
INVENTOR(S) : Brian T. Seymour

It is certified that error appears in the above-indentified patent and that said Letters Patent is hereby corrected as shown below:

Column 8, Line 64, Claim 9, after "membrane" delete "horn" and insert --accessory--.

Column 9, Line 25, Claim 14, after "membrane" insert --material--.

Signed and Sealed this

Fourth Day of February, 1997

Attest:

BRUCE LEHMAN

*Attesting Officer*  *Commissioner of Patents and Trademarks*